US006113023A

United States Patent [19]
Ueffing et al.

[11] Patent Number: 6,113,023
[45] Date of Patent: Sep. 5, 2000

[54] TAKE-UP DEVICE

[75] Inventors: Norbert Ueffing, Osterode; Joachim Huntgeburth; Heinrich Von Sothen, both of Duderstadt, all of Germany

[73] Assignee: Piller-GmbH, Osterode, Germany

[21] Appl. No.: 09/174,948

[22] Filed: Oct. 19, 1998

Related U.S. Application Data

[63] Continuation of application No. PCT/EP98/01006, Feb. 21, 1998.

[30] Foreign Application Priority Data

Feb. 24, 1997 [DE] Germany .......................... 197 07 205

[51] Int. Cl.[7] .................................................. B65H 75/38
[52] U.S. Cl. ................. 242/388.6; 254/278; 191/12.2 R
[58] Field of Search ..................... 242/388.6; 191/12.2 R, 191/12.4, 12.2 A; 254/278; 439/13

[56] References Cited

U.S. PATENT DOCUMENTS

| | | | |
|---|---|---|---|
| 2,606,978 | 8/1952 | Scanlon .............................. | 191/12.2 R |
| 3,128,857 | 4/1964 | Walton ................................ | 242/388.6 |
| 3,539,123 | 11/1970 | Shutt . | |
| 3,743,796 | 7/1973 | Rosencrantz ....................... | 191/12.2 A |
| 3,854,017 | 12/1974 | Crim ................................... | 191/12.2 R |
| 4,379,615 | 4/1983 | Toda et al. ........................... | 242/388.6 |
| 4,520,999 | 6/1985 | Philips et al. ........................ | 254/278 |
| 4,661,660 | 4/1987 | von Sothen et al. ............... | 191/12.2 A |
| 5,212,760 | 5/1993 | Goetz .................................. | 242/388.6 |
| 5,358,190 | 10/1994 | Fladung ............................. | 191/12.2 R |

FOREIGN PATENT DOCUMENTS

| | | |
|---|---|---|
| 2 146 118 | 3/1973 | France . |
| 2 491 043 | 4/1982 | France . |
| 30 08 544 | 9/1981 | Germany . |
| 35 17 838 | 11/1986 | Germany . |

OTHER PUBLICATIONS

*Patent Abstracts of Japan*, Abstract of Japanese Patent, "Treating Device In Rotary Section For Cable and The Like", Published Mar. 10, 1984 as Publication No. 59 043776, vol. 008, No. 146, Jul. 7, 1984, Application No. 57152636.

*Patent Abstracts of Japan*, Abstract of Japanese Patent, "Device For Winding and Unwinding Cable", Published Jul. 1, 1985 as Publication No. 60 122671, vol. 009, No. 279, Nov. 7, 1985, Application No. 58229127.

*Patent Abstracts of Japan*, Abstract of Japanese Patent, "Electric Wiring Construction Relative Rotating Body", Published Sep. 30, 1994 as Publication No. 06 276655, vol. 018, No. 687, Dec. 26, 1994, Application No. 05055271.

*Primary Examiner*—Donald P. Walsh
*Assistant Examiner*—Emmanuel M. Marcelo
*Attorney, Agent, or Firm*—Barry R. Lipsitz; Ralph F. Hoppin

[57] ABSTRACT

In order to improve upon a take-up device for a line comprising a frame on which a take-up drum for the line is mounted so as to be rotatable about an axis, and a rotary coupling between a line terminal fixed to the frame and a line terminal fixed to the take-up drum, in such manner that as reliable as possible a rotary coupling is provided, it is proposed that the rotary coupling comprises a first auxiliary drum which co-rotates with the take-up drum and a second auxiliary drum which is fixed relative to the frame, that the rotary coupling comprises a rotating element which is rotatable about the rotation axis at a lower speed than the first auxiliary drum, and that the rotary coupling comprises a connection line which can be wound onto or unwound from the first auxiliary drum, passes from the first auxiliary drum to the rotating element in a first strand and passes from the rotating element to the second auxiliary drum in a second strand, and can be unwound from or wound onto said second auxiliary drum.

18 Claims, 5 Drawing Sheets

TAKE-UP DEVICE

This is a continuation of PCT/EP98/01006, filed Feb. 21, 1998.

BACKGROUND OF THE INVENTION

The invention relates to a take-up device for a line, in particular for an electric cable, comprising a frame on which a take-up drum for the line is mounted so as to be rotatable about an axis of rotation, and a rotary coupling between a line terminal fixed relative to the frame and a line terminal fixed relative to the take-up drum.

Such take-up devices are known in the prior art. In these take-up devices the rotary coupling is designed such that a part of the line experiences a greater or lesser degree of twisting.

These designs have the disadvantage that the part of the line which undergoes twisting is subjected to strong mechanical stresses and thus permits only a limited life of the rotary coupling.

Other designs, suitable only for electric cables, provide for example slip ring contacts which however are likewise subject to wear and susceptible to faults.

SUMMARY OF THE INVENTION

Therefore the object of the invention is to improve upon a take-up device of the type defined in such manner as to provide as reliable as possible a rotary coupling.

This object is achieved in a take-up device of the type described in the introduction, in accordance with the invention, in that the rotary coupling comprises a first auxiliary drum which co-rotates with the take-up drum, and a second auxiliary drum which is fixed relative to the frame, said auxiliary drums being arranged coaxially with an axis of rotation, that the rotary coupling comprises a rotating element which is rotatable about the rotation axis at a lower speed than the first auxiliary drum, that the rotary coupling comprises a connection line which on one side is fixed relative to the take-up drum and on the other side is fixed relative to the frame, which extends without twisting and which can be wound onto or unwound from the first auxiliary drum, passes from the first auxiliary drum to the rotating element in a first strand and passes from the rotating element to the second auxiliary drum in a second strand and can be unwound from or wound onto said second auxiliary drum, that the rotating element provides that the first strand and the second strand extend substantially without sagging, and that in its rotational movement the rotating element takes up the line length unwound from the one auxiliary drum and delivers the line length wound onto the other auxiliary drum.

The advantage of the design according to the invention consists in that it prevents the connection line from being subjected to twisting stress and thus winding merely takes place from the one auxiliary drum to the other so that the only stress to which the connection line is subjected consists of the winding stress.

In principle it would be conceivable to design the rotating element such that it likewise comprises a take-up drum, whereby a winding-up or unwinding of the connection line takes place between the rotating element and the respective auxiliary drum.

However it is particularly favourable for the connection line between the first strand and the second strand to pass in winding-free manner across the rotating element, in particular across a guide means of the rotating element, so that the connection line is always drawn across the guide means of the rotating element by the line length which is formed by the unwinding from the one auxiliary drum and is required for the winding-up onto the other auxiliary drum.

This can be achieved in a particularly simple manner if the connection line passes across the guide means of the rotating element in the form of a bend.

The guide means for the rotating element could consist for example of a sliding guide for the connection line. However, a particulary favourable design is that in which the rotating element comprises a continuous guide means which guides the connection line by means of rollers as in this case this continuous guide means offers only a very small frictional resistance to the connection line drawn through the rotating element and thus likewise reduces the stress on the connection line.

In connection with the previous description of the individual features of the invention, it has simply been assumed that the connection line passes from the one auxiliary drum to the other auxiliary drum across the rotating element.

Here for example the rotating element could be fixed in the axial direction of the auxiliary drums and merely rotate about the rotation axis in the described manner. However, a particularly favourable embodiment provides that the guide means for the connection line runs on a linear guide extending in parallel to the rotation axis and thus has the possibility of moving in a direction parallel to the rotation axis, such that the rotating element always ensures the gentlest possible winding-up of the connection line onto the one auxiliary drum and unwinding of the connection line from the other auxiliary drum.

Here it is particularly favourable for the rotating element guide means provided for the connection line to be designed such that the first strand and second strand extend substantially in parallel to one another, and thus in particular extend in a direction substantially at right angles to the rotation axis, whereby a clearly defined guidance of the connection cable on the respective auxiliary drum can be achieved without unnecessary friction of the connection line against the auxiliary drum, in particular using a coil which guides the connection line on the respective auxiliary drum.

No details have as yet been given concerning the rotational movement for the rotating element. Thus for example, in particular in an embodiment in which the rotating element need execute only a small number of rotational movements, it would be conceivable to subject the rotating element to a spring force in a direction in which the strands are tensioned, which spring force is simultaneously responsible for the rotational movement of the rotating element.

However, it is particularly favourable for, and gentle on, the connection line if the rotating element is driven in a fixed ratio to the rotation of the first auxiliary drum. In this case, due to the fixed ratio between the rotational speeds, it is also possible substantially to eliminate tensile stress possibly occurring in the connection line.

Here it is particularly favourable for the rotation of the first auxiliary drum and the rotational movement of the rotating element to be synchronized with one another.

This could be achieved for example by two drive means which are electronically synchronized with one another.

However, synchronization of the rotational movement of the rotating element with that of the first auxiliary drum can be achieved particularly simply if the rotation of the first auxiliary drum and the rotational movement of the rotating element are coupled via a gear.

The gear could be arranged on the take-up device according to the invention in a variety of ways. Thus for example it would be conceivable to fix the gear to the rotating take-up drum. However, a particularly favourable embodiment provides that the gear is fixed relative to the frame and thus does not co-rotate with the take-up drum.

A particularly favourable, and also maintenance-friendly, arrangement of the gear provides that it is arranged outside of the take-up drum.

No details concerning the mounting of the rotating element have been given in association with the previous description of the individual exemplary embodiments. Thus for example it would be conceivable to mount the rotating element on a ring, for example with an annular slideway, rotating about the auxiliary drum.

A particularly simple and favourable embodiment provides that the rotating element is rotatably mounted on a drive shaft for the first auxiliary drum. In this case the mounting of the rotating element can also easily be combined with the mounting of the drive shaft for the first auxiliary drum.

In order to provide as compact as possible a take-up device, it is particularly advantageous for the rotary coupling to be substantially arranged in an inner area of the take-up drum. On the one hand this embodiment offers the possibility of providing a relatively large take-up drum on which long lengths of the line to be taken up can be wound. Additionally, this embodiment permits optimization of the compactness in that the rotary coupling no longer increases the structural space required for the take-up drum but is arranged in an inner area of the take-up drum.

Furthermore, the embodiment of the invention which also requires a drive means for the take-up drum is particularly compact if the take-up drum is driven by a rotary drive means arranged in an inner area of the drum, so that again no additional structural space is required for the rotary drive for the take-up drum.

To be able to provide the auxiliary drums with as small as possible a diameter without subjecting the individual lines comprised by the connection line to excessive mechanical stress, a particularly advantageous exemplary embodiment provides that the connection line comprises a plurality of separate individual lines which can be commonly wound from one auxiliary drum onto the other by means of the rotating element.

In principle, the individual lines could be arranged on the auxiliary drum extending in parallel to one another. However, a particularly compact arrangement of the individual lines can be achieved if the individual lines are arranged on the auxiliary drums extending radially one upon another so that the axial structural space occupied by the auxiliary drums can be kept as small as possible.

To be able to stabilize the position of the individual lines extending radially one upon another on the auxiliary drums, preferably it is provided that the auxiliary drums comprise guide ribs which extend in the form of a coil and between which the individual lines are located.

However, for the individual lines which are unwound from and wound-up onto the auxiliary drums extending radially one upon another to be guided as favourably as possible in the rotating element, it is provided that the individual lines pass across the rotating element extending one beside another, i.e. that the individual lines pass across the rotating element in juxtaposed U- or V-shaped bends, where the U- or V-shaped bends of the individual lines have approximately the same shape and are arranged next to one another.

Further features and advantages of the invention form the subject of the following description and the illustration of some exemplary embodiments in the drawing.

DETAILED DESCRIPTION OF THE INVENTION

Figure 1:
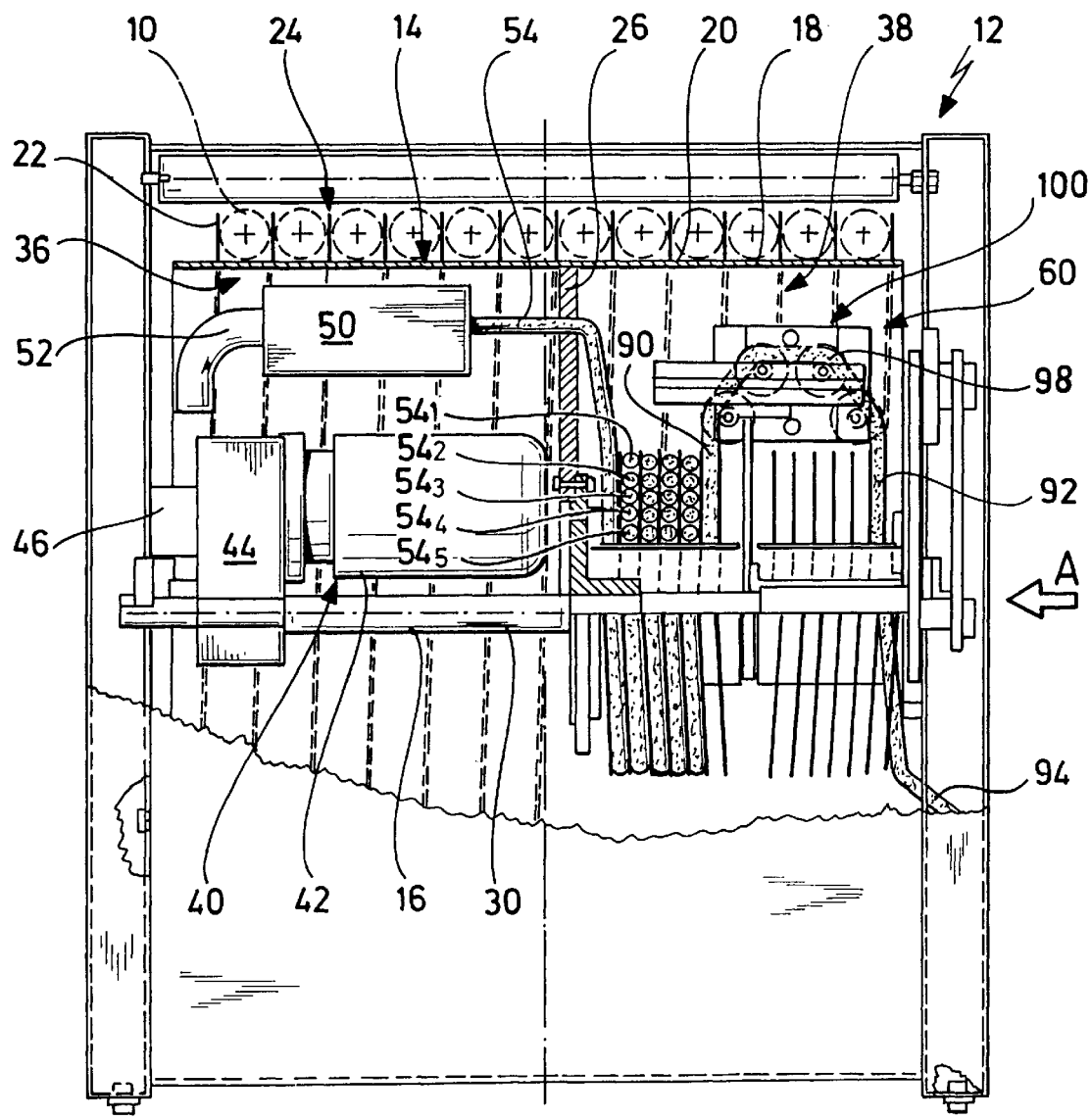
FIG. 1 is a partially broken away front view of a take-up device according to the invention.

A first exemplary embodiment, shown in FIG. 1, of a take-up device according to the invention for a line, in this case an electric cable 10 serving as flexible single-core or multi-core power supply cable, in particular for an airport ground power supply, comprises a frame bearing the general reference 12 in which a take-up drum 14 is mounted so as to be rotatable about an axis of rotation 16.

The take-up drum 14 comprises a cylindrical drum body 18 on the outer surface 20 of which a rib 22 extends helically relative to the rotation axis 16 and thus forms a coil 24 arranged on the outer surface 20, said rib 22 being arranged at right angles to the cylindrically shaped outer surface 20. The pitch of the coil 24 here is selected such that the cable 10 can be inserted into the coil 24 with a number of turns corresponding to the number of turns of the coil 24, so that one turn of the cable 10 can in each case be wound between directly consecutive turns of the coil.

Figure 2:
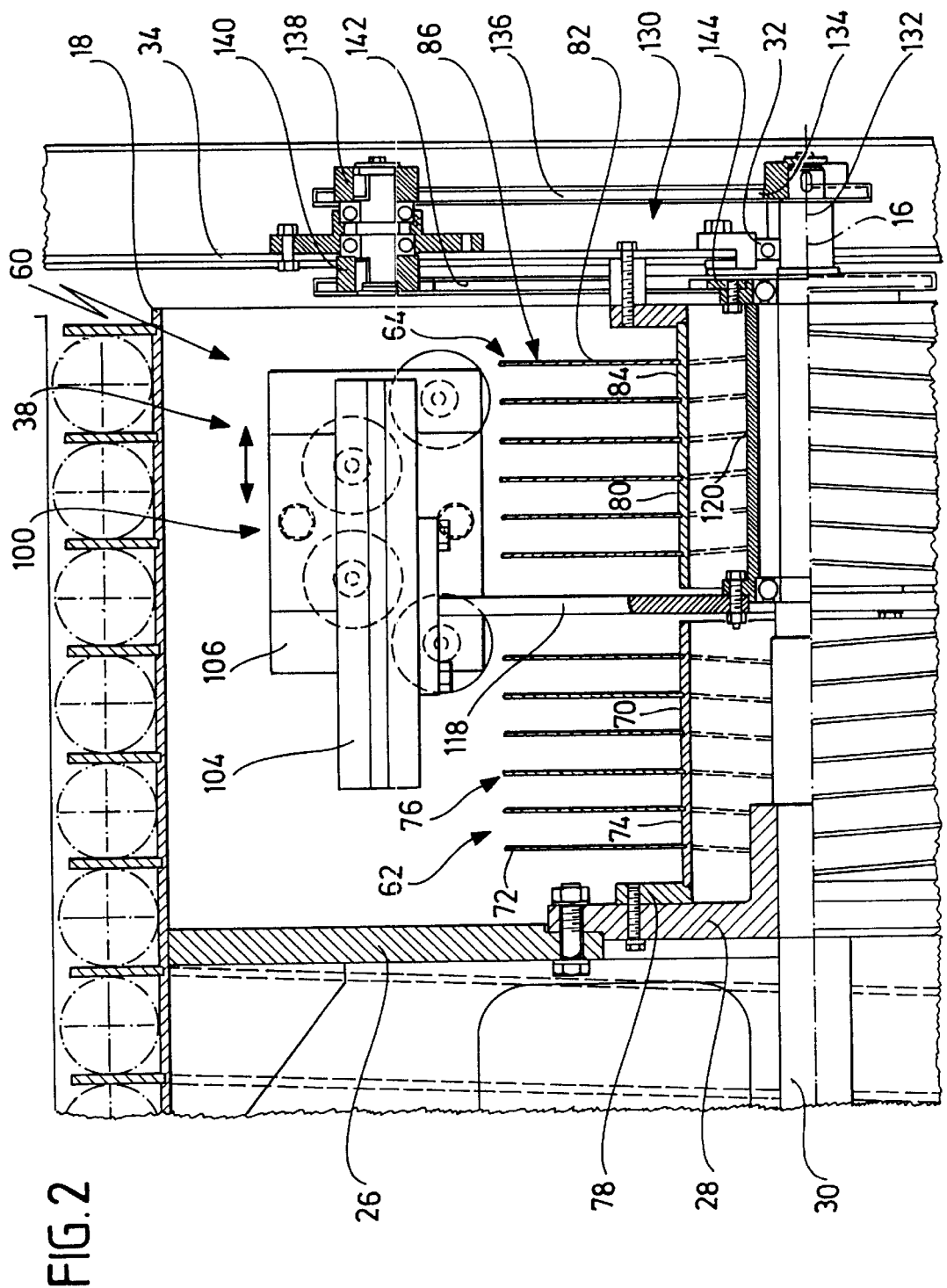
FIG. 2 is an enlarged partial view of a semilateral inner area of a take-up drum with rotary device.

The drum body 18 is guided cylindrically to the axis 16 in that it is mounted on a supporting wall 26 which is arranged centrally in an axial direction of the drum body 18 in parallel to the rotation axis 16 and which, as shown in FIG. 2, is connected to a flange 28 which is mounted non-rotationally on a shaft bearing the general reference 30 and extending coaxially with the rotation axis 16.

At its end the shaft 30 is mounted via radial bearings 32 on a bearing support 34 of the frame 12 so as to be rotatable about the rotation axis 16.

Inside the drum body 18 the supporting wall 26 forms a first inner area 36 and a second inner area 38 which are separated from one another by the supporting wall 26.

The first inner area 26 contains a drive means for the take-up drum 14, which drive means bears the general reference 40 and is formed for example as an electric motor 42 with a gear 44, said gear 44 acting directly on the shaft 30 in order to rotate it. Additionally a torque support 46, which positions the drive means 40 non-rotatably relative to the frame 12, is provided between the drive means 40 and the frame 12.

Additionally, the first inner area 36 contains a terminal box bearing the general reference 50 which is fixed relative to the take-up drum 14, preferably the drum body 18, and in which an end 52 of the cable 10 fixed to the take-up drum is connected, and specifically to a connection line bearing the general reference 54.

Here the connection line 54 comprises, for example, a total of five highly flexible individual lines 54₁ to 54₅ of equal thickness, all of which lead out of the terminal box 50.

The connection line 54 forms part of a rotary coupling bearing the general reference 60 which is substantially arranged in the second inner area 38 of the drum body 18.

As shown in particular in an enlarged view in FIG. 2, this rotary coupling comprises a first auxiliary drum 62 which is mounted on the shaft 30 and non-rotatably connected thereto, and a second auxiliary drum 64 which is fixed to the frame, said auxiliary drums being arranged coaxially with one another and preferably coaxially with the rotation axis 16 in the second inner area 38.

Here the first auxiliary drum 62 itself comprises a cylindrical auxiliary drum body 70 which is arranged coaxially with the rotation axis 16 and on which a guide rib 72 is arranged such that said guide rib extends at right angles to a cylindrical outer surface 74 of the auxiliary drum body 70.

The guide rib 72 likewise extends in a coil formation 76 relative to the rotation axis 16, where the number of turns of the coil 76 corresponds to half the number of turns of the coil 24 for the cable 10 arranged on the drum body 18.

Radially to the rotation axis 16, the guide ribs 72 extend beyond the cylindrical outer surface 74 by an amount such that the individual lines 54₁ to 54₅ of the connection line 54 can be located between two consecutive turns of the coil 76 extending radially one upon another, so that each individual turn of the coil 76 accommodates the individual lines 51₁ to 54₅ of the connection line 54 extending radially one upon another.

Preferably the auxiliary drum body 70 of the first auxiliary drum 62 commences from a mounting flange 78 bearing against, and connected to, the flange 28 which is non-rotatably mounted on the shaft 30 and bears the supporting wall 26, where the auxiliary drum body 70 encloses in partially tubular fashion a portion of the shaft 30 adjoining the flange 28 and extending through the second inner area 38.

Additionally, the second auxiliary drum body 64 which is non-rotatably fixed to the frame 12, preferably the bearing support 34, is arranged between the first auxiliary drum body 62 non-rotationally connected to the shaft 30 and that side of the frame 12 facing towards the second inner area 38, preferably the bearing support 34.

The second auxiliary drum 64 likewise comprises an auxiliary drum body 80, which preferably has the same diameter as the auxiliary drum body 70, and a guide rib 82 which, in the same manner as the guide rib 72, extends helically although in the opposite winding direction and is likewise arranged at right angles to a cylindrical outer surface 84 of the auxiliary drum body 80 and extends radially beyond said outer surface 84 by a distance such that each turn of the coil 86 thus formed is capable of accommodating the five individual lines 54₁ to 54₅ extending radially one upon another.

The number of turns of the coil 86 corresponds to the number of turns of the coil 76 and thus to half the number of turns of the coil 24.

The connection line 54 has a length such that, as illustrated in FIG. 1, when the connection line has been fully wound into the coil 76 the connection line is substantially completely unwound from the coil 86 and vice versa.

Figure 3:
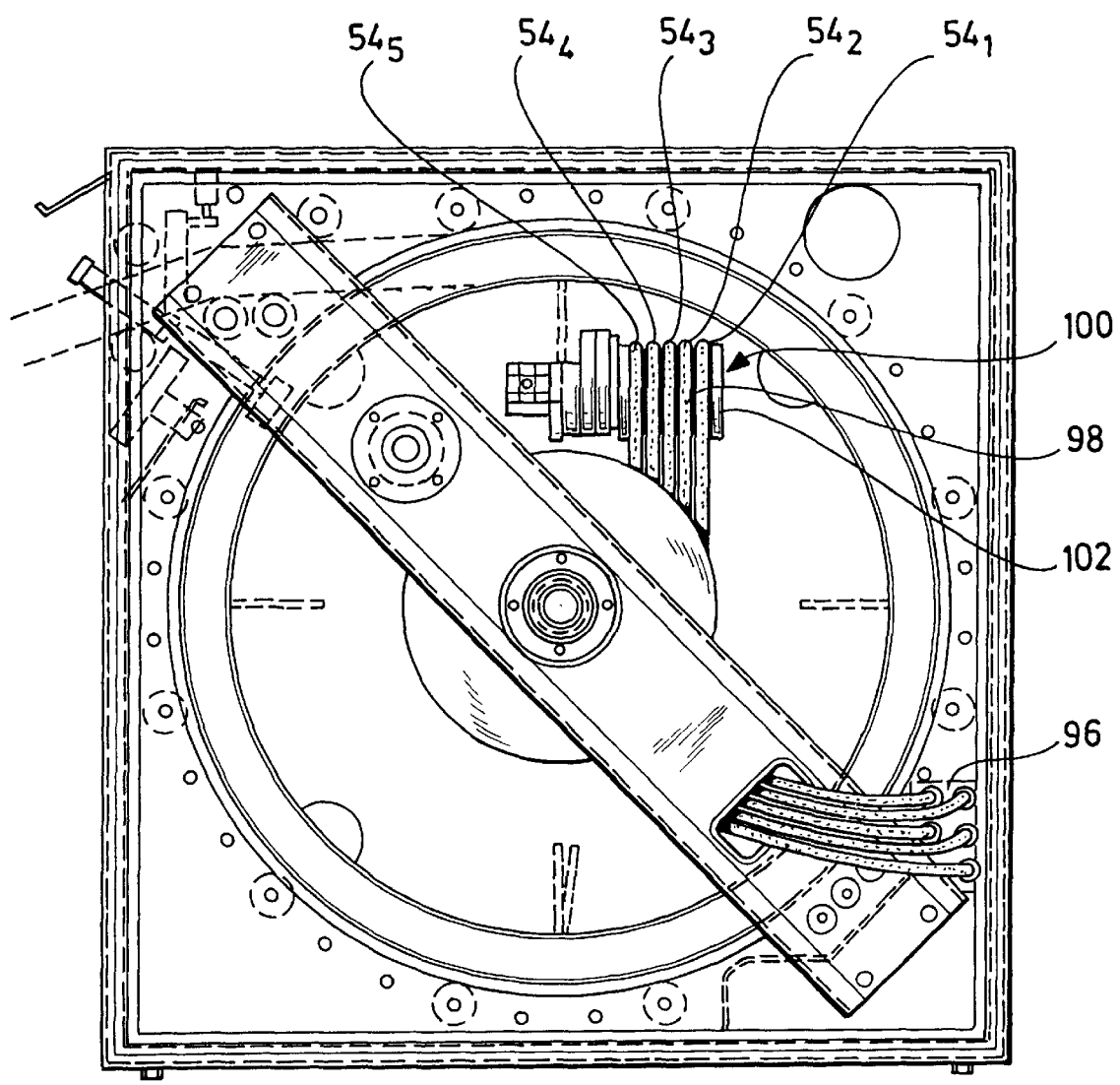
FIG. 3 is a side view in the direction of the arrow A in FIG. 1.

Here, as illustrated in FIG. 1, from the terminal box 50 the connection line is firstly inserted into a starting section of the coil 76 facing towards the supporting wall 26 and is wound therein until a first strand 90 of the connection line 54 runs from the first auxiliary drum 62 to a rotating element bearing the general reference 100 and is drawn across the rotating element 100 in a manner to be explained later in the description, and then a second strand 92 of the connection line runs to the second auxiliary drum 64 and is wound thereon such that, commencing from a last turn of the coil 86 for the line 54 facing towards the frame 12, an end portion 94 is guided along the bearing support 34, as shown in FIG. 3, to a terminal box 96 on the frame side.

The connection line 54 passes across the rotating element 100 with a U- or V-shaped bend 98 between the first strand 90 and the second strand 92, in which bend 98, as illustrated in FIG. 3, all the individual lines 54₁ to 54₅ pass across a guide roller assembly 102 extending one beside another, such that both the first strand 90 and the second strand 92 pass to the auxiliary drums 62 and 64 on the same side of the rotation axis 16.

Figure 4:
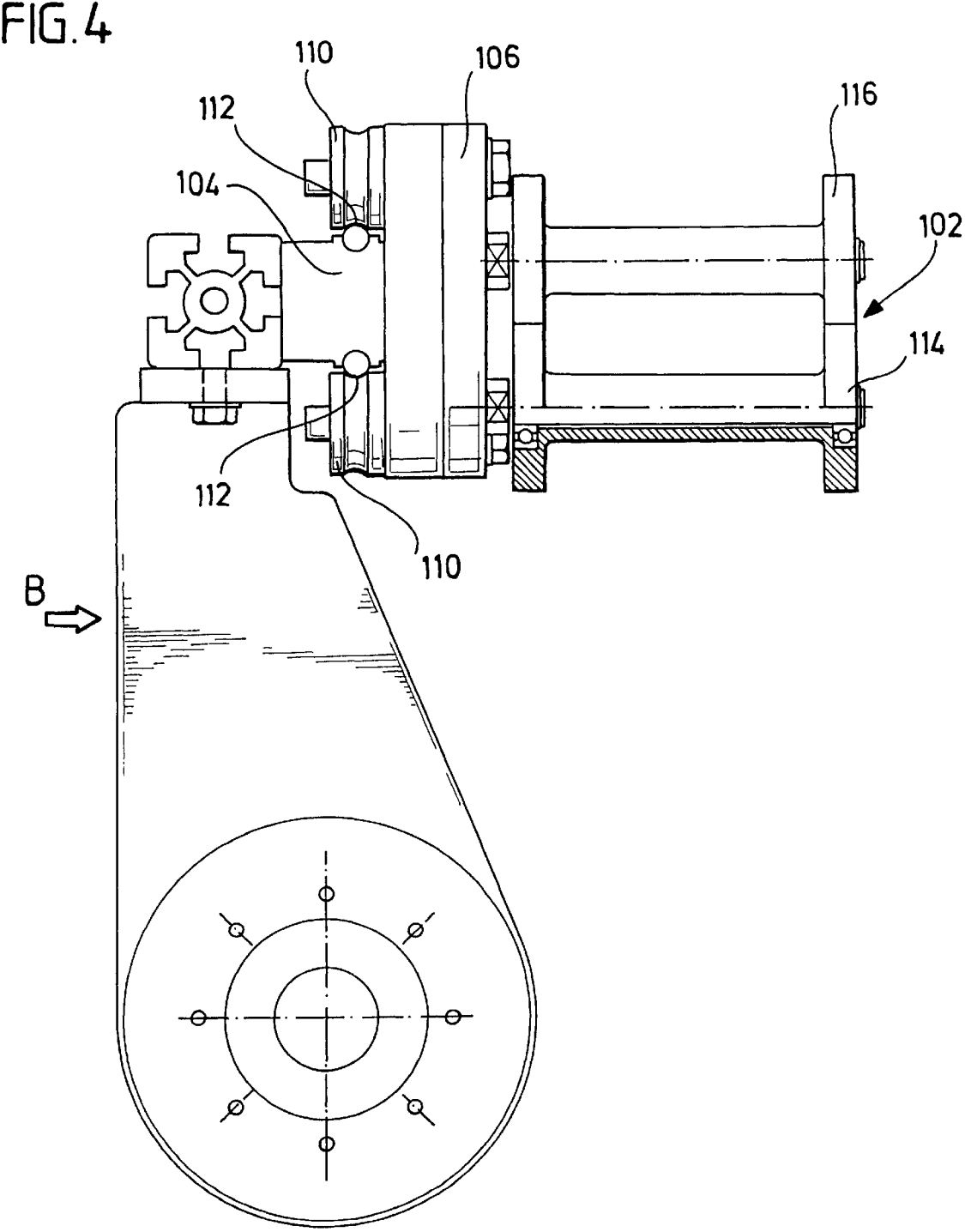
FIG. 4 is an enlarged view of a rotating element according to the invention in the same direction of view as in FIG. 3
Figure 5:
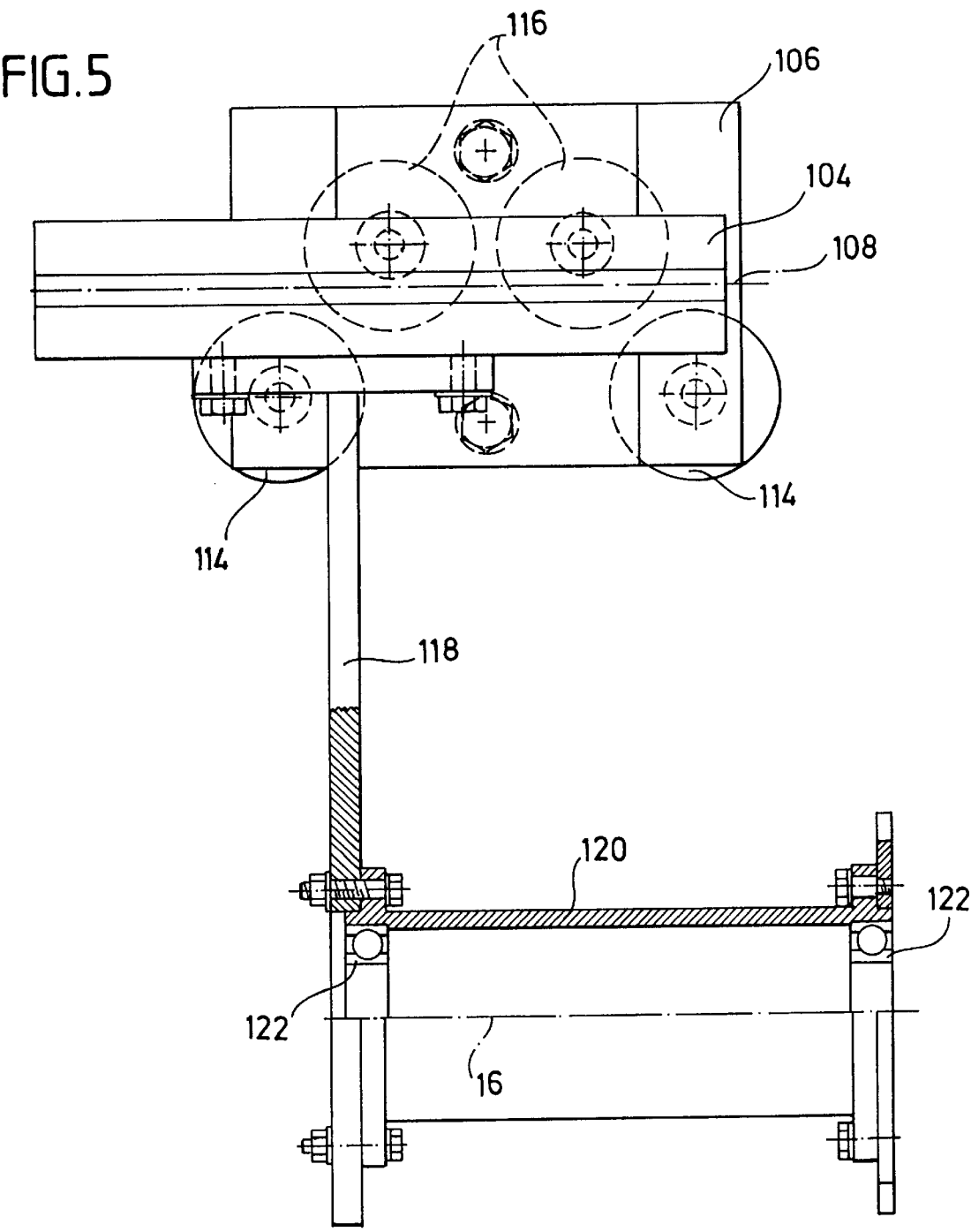
FIG. 5 is an enlarged, partially sectional view of the rotating element according to the invention in the direction of the arrow B in FIG. 4.

As illustrated in FIGS. 4 and 5, the rotating element 100 comprises a linear guide 104 which extends in parallel to the rotation axis 16 and on which a guide carriage bearing the general reference 106 is displaceable in the direction of the rotation axis 16, and specifically in a guide direction 108 parallel to said rotation axis 16.

The guide carriage 106 slides, for example with a roller assembly 110, on guide surfaces 112 extending on both sides of the linear guide 104.

In accordance with the invention, the guide carriage 106 is freely moveable along the linear guide 104.

The guide carriage 106 itself bears the guide roller assembly 102 which preferably comprises two lower guide rollers 114 and two upper guide rollers 116 arranged in parallel to one another, where the lower guide rollers 114 are preferably spaced from one another by a distance selected such that the strands 90 and 92 passing to the lower guide rollers 114 in each case extend substantially in parallel to one another and in particular also in parallel to the guide ribs 72 and 82. Conversely, the upper guide rollers 116, which are situated on a side of the lower guide rollers facing away from the auxiliary drums 62 and 64, are spaced from one another by a shorter distance and are arranged between the lower guide rollers 114 so that the connection line 54 passes from the lower guide rollers 114 across the upper guide rollers 116 in the previously described U- or V-shaped bend formation.

All the guide rollers 114 and 116 of the guide roller assembly 102 are mounted on the guide carriage 106 so as to be freely rotatable.

The linear guide 104 is itself fixed to a bearing arm 118 which extends radially from a hollow shaft 120, said hollow shaft 120 surrounding the shaft 30 and being mounted so as to be rotatable relative to the shaft 30 by means of pivot bearings 122.

It is thus possible for the hollow shaft 120 to rotate at a different speed to the shaft 30.

Here, as illustrated in particular in FIG. 2, the hollow shaft 120 is situated inside the auxiliary drum body 80 of the second auxiliary drum 64, is surrounded by the auxiliary drum 64, and extends substantially along its entire axial length in the direction of the rotation axis, where the bearing arm 118 between the first auxiliary drum 62 and the second auxiliary drum 64 extends in the radial direction of the rotation axis 16 up to the linear guide 104, and the linear guide 104 is arranged radially outside of the auxiliary drums 62 and 64 such that the guide carriage 106 can move freely externally in the radial direction relative to the auxiliary drums 62 and 64 in order to deflect the cable emanating from the one auxiliary drum to the other auxiliary drum.

The rotational movement of the rotating element 100 about the rotation axis 16 is effected in that the hollow shaft 120 is driveable by means of a gear 130 comprising a first chain wheel 134 which is mounted non-rotatably on the shaft 30, preferably at an end 132 of the shaft 30 extending across the drum body 18 and through the bearing support 34, and from which a drive chain 136 drives a second chain wheel 138 which is itself rotatably mounted on the bearing support 34.

This second chain wheel drives a third chain wheel 140 which is mounted on a side of the bearing support 34 facing towards the drum body 18 and itself drives a second chain 142 via which a chain wheel 144 non-rotatably connected to the hollow shaft 120 of the rotating element 100 can be driven.

Here the gear 130 is designed such that the hollow shaft 120 rotates at half the rotational speed of the shaft 30. Thus the rotating element 100 also rotates at half the rotational speed at which the shaft 30 rotates and at which the first auxiliary drum 62 also rotates, while the second auxiliary drum 64 always remains stationary due to its fixed connection to the frame 12.

This has the result that upon the rotation of the first auxiliary drum 62, the rotating element 100, which rotates at half the speed, for example unwinds a defined length of the connection cable 54 from the first auxiliary drum 62.

However, as the rotating element 100 rotates faster than the second auxiliary drum 64 for the winding-up of the connection cable 54 thereon, at the same relative speed at which it rotates slower than the first auxiliary drum 62 for the unwinding of the connection cable 54 therefrom, when the diameters of the auxiliary drum bodies 70 and 80 are identical the length of connection cable 54 in each case unwound via the rotating element 100 is equal to the length wound onto the second auxiliary drum 64 if the rotating element 100—as already described—rotates at half the rotation speed of the first auxiliary drum 62.

In this way the same length of connection cable 54 is always unwound from the first auxiliary drum 62 as is wound onto the second auxiliary drum 64 and vice versa, so that the connection cable 54 establishes a connection between the terminal box 96 fixed to the frame and the terminal box 50 co-rotating with the take-up drum 14 without any part of the connection cable 54 experiencing twisting. The connection cable 54 is merely wound back and forth between the first auxiliary drum 62 and the second auxiliary drum 64.

Additionally, since the relative speed between the rotating element 100 and the first auxiliary drum 62 corresponds to half the speed of the first auxiliary drum 62 relative to the frame 12, and thus also of the take-up drum 14 relative to the frame 12, the number of turns of the coil 76 corresponds to half the number of turns of the coil 24, so that in the rotary coupling 60 the number of turns of the connection cable 54 which must be wound from one auxiliary drum to the other corresponds only to half the number of turns of the cable 10 which are unwound from or wound-up onto the take-up drum 14.

Thus, since it only requires to be wound from one auxiliary drum onto the other, the connection cable 54 fixed on one side to the take-up drum and on the other side to the frame is subjected to the least possible wear, and in particular to no wear-inducing twisting, thus ensuring long, disturbance-free operation of the rotary coupling 60 according to the invention.

What is claimed is:

1. Apparatus for taking-up a line comprising:
   a frame on which a take-up drum for the line is mounted so as to be rotatable about an axis,
   a rotary drive for driving said take-up drum, said rotary drive being arranged within said take-up drum, and
   a rotary coupling between a line terminal fixed to the frame and a line terminal fixed to the take-up drum, wherein:
   the rotary coupling comprises a first auxiliary drum which co-rotates with the take-up drum and a second auxiliary drum which is fixed relative to the frame,
   said auxiliary drums are arranged coaxially with an axis of rotation,
   the rotary coupling comprises a rotating element which is rotatable about the rotation axis at a lower speed than the first auxiliary drum,
   the rotary coupling comprises a connection line which is fixed on one side relative to the take-up drum and is fixed on the other side relative to the frame,
   said connection line extends without twisting and is windable onto or unwindable from the first auxiliary drum,
   said connection line passes from the first auxiliary drum to the rotating element in a first strand and passes from the rotating element to the second auxiliary drum in a second strand and is unwindable from or windable onto said second auxiliary drum,
   the rotating element provides that the first strand and second strand extend substantially without sagging, and
   in its rotational movement, the rotating element takes up the line length unwound from the one auxiliary drum and delivers the line length wound onto the other auxiliary drum.

2. Apparatus according to claim 1, wherein the connection line between the first strand and the second strand is guided across the rotating element in winding-free fashion.

3. Apparatus according to claim 2, wherein the connection line is guided across a guide means of the rotating element.

4. Apparatus according to claim 3, wherein the rotating element comprises a continuous guide means which guides the connection line by means of rollers.

5. Apparatus according to claim 2, wherein the connection line is guided across the rotating element in the form of a bend.

6. Apparatus according to claim 5, wherein a guide means for the connection line runs on a linear guide extending in parallel to the rotation axis.

7. Apparatus according to claim 6, wherein a guide means of the rotating element provided for the connection line is designed such that the first strand and second strand extend substantially in parallel to one another.

8. Apparatus according to claim 1, wherein the rotating element is driven in a fixed ratio to the rotation of the first auxiliary drum.

9. Apparatus according to claim 8, wherein the rotation of the first auxiliary drum and the rotational movement of the rotating element are synchronized with one another.

10. Apparatus according to claim 9, wherein the rotation of the first auxiliary drum and the rotational movement of the rotating element are coupled via a gear.

11. Apparatus according to claim 10, wherein the gear is fixed relative to the frame.

12. Apparatus according to claim 11, wherein the gear is arranged outside of the take-up drum.

13. Apparatus according to claim 1, wherein the rotating element is rotatably mounted on a drive shaft for the first auxiliary drum.

14. Apparatus according to claim 1, wherein the rotary coupling is substantially arranged in an inner area of the take-up drum.

15. Apparatus for taking-up a line comprising:
a frame on which a take-up drum for the line is mounted so as to be rotatable about an axis, and
a rotary coupling between a line terminal fixed to the frame and a line terminal fixed to the take-up drum, wherein:
the rotary coupling comprises a first auxiliary drum which co-rotates with the take-up drum and a second auxiliary drum which is fixed relative to the frame,
said auxiliary drums are arranged coaxially with an axis of rotation,
the rotary coupling comprises a rotating element which is rotatable about the rotation axis at a lower speed than the first auxiliary drum,
the rotary coupling comprises a connection line which is fixed on one side relative to the take-up drum and is fixed on the other side relative to the frame,
said connection line extends without twisting and is windable onto or unwindable from the first auxiliary drum,
said connection line passes from the first auxiliary drum to the rotating element in a first strand and passes from the rotating element to the second auxiliary drum in a second strand and is unwindable from or windable onto said second auxiliary drum,
the connection line comprises a plurality of individual lines which can be commonly wound from one auxiliary drum to the other auxiliary drum by means of the rotating element,
the rotating element provides that the first strand and second strand extend substantially without sagging, and
in its rotational movement, the rotating element takes up the line length unwound from the one auxiliary drum and delivers the line length wound onto the other auxiliary drum.

16. Apparatus according to claim 15, wherein the individual lines are arranged on the auxiliary drums extending radially one upon another.

17. Apparatus according to claim 16, wherein the auxiliary drums comprise guide ribs which extend in the form of a coil and between which the individual lines are located.

18. Apparatus according to claim 15, wherein the individual lines pass across the rotating element extending one beside another.

* * * * *